(12) United States Patent
Palese et al.

(10) Patent No.: US 12,088,343 B2
(45) Date of Patent: Sep. 10, 2024

(54) PHOTONIC INTEGRATED CIRCUIT-BASED POLARIZATION-INDEPENDENT OPTICAL DEVICES

(71) Applicant: Raytheon Company, Waltham, MA (US)

(72) Inventors: Stephen P. Palese, Redondo Beach, CA (US); Duane D. Smith, Rancho Palos Verdes, CA (US)

(73) Assignee: Raytheon Company, Tewksbury, MA (US)

( * ) Notice: Subject to any disclaimer, the term of this patent is extended or adjusted under 35 U.S.C. 154(b) by 5 days.

(21) Appl. No.: 17/659,789

(22) Filed: Apr. 19, 2022

(65) Prior Publication Data

US 2023/0344517 A1    Oct. 26, 2023

(51) Int. Cl.
*H04B 10/40* (2013.01)
*G02B 6/27* (2006.01)
*G02B 6/293* (2006.01)

(52) U.S. Cl.
CPC ........... *H04B 10/40* (2013.01); *G02B 6/2706* (2013.01); *G02B 6/29301* (2013.01)

(58) Field of Classification Search
CPC .................. H04B 10/40; G02B 6/2706; G02B 6/29301
USPC ....................................................... 398/135
See application file for complete search history.

(56) References Cited

U.S. PATENT DOCUMENTS

| | | | |
|---|---|---|---|
| 3,975,628 A | 8/1976 | Graves et al. | |
| 4,720,642 A | 1/1988 | Marks | |
| 6,856,284 B1 | 2/2005 | Cangiani | |
| 7,408,507 B1 | 8/2008 | Paek et al. | |
| 7,729,572 B1 | 6/2010 | Pepper et al. | |
| 7,949,030 B2 | 5/2011 | Volodin | |
| 8,068,235 B1 | 11/2011 | Marron et al. | |
| 9,740,079 B1* | 8/2017 | Davids | G02B 6/1347 |
| 10,020,882 B2 | 7/2018 | Uysal et al. | |
| 10,123,327 B2 | 11/2018 | Hu et al. | |
| 10,790,909 B1 | 9/2020 | Suni | |
| 10,838,222 B2 | 11/2020 | Khachaturian et al. | |
| 10,866,487 B1 | 12/2020 | Keller et al. | |

(Continued)

FOREIGN PATENT DOCUMENTS

| | | |
|---|---|---|
| CN | 105026970 A | 11/2015 |
| EP | 3761528 A1 | 1/2021 |

(Continued)

OTHER PUBLICATIONS

Huang et al; Gate-tunable conducting oxide metasurfaces; 2015; Research Center for Applied Sciences, pp. 1-13. (Year: 2015).*
Ma et al; Broadband circular and linear polarization conversions realized by thin birefringent reflective metasurfaces; 2014; Optical Society of America; pp. 1-8. (Year: 2014).*
Abediasl, "Monolithic optical phased-array transceiver in a standard SOI CMOS process", Optical Society of America, 2015, 11 pages.

(Continued)

*Primary Examiner* — Amritbir K Sandhu

(57) ABSTRACT

An apparatus includes a photonic integrated circuit having an optical phased array, where the optical phased array includes multiple unit cells. Each unit cell includes an antenna element configured to transmit or receive optical signals having a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

20 Claims, 9 Drawing Sheets

(56) References Cited

U.S. PATENT DOCUMENTS

| | | | |
|---|---|---|---|
| 11,029,465 | B1 | 6/2021 | Rakowski et al. |
| 11,183,757 | B2 | 11/2021 | Puleri et al. |
| 11,320,588 | B1 | 5/2022 | Mazed |
| 11,476,576 | B2 | 10/2022 | Palese et al. |
| 11,532,881 | B2 | 12/2022 | Kendrick et al. |
| 11,575,204 | B1 | 2/2023 | Veysoglu |
| 11,579,360 | B2 | 2/2023 | Bian et al. |
| 11,644,621 | B2 | 5/2023 | Yengst et al. |
| 11,664,894 | B2 | 5/2023 | Shamee |
| 11,703,739 | B2 | 7/2023 | Kendrick et al. |
| 11,716,141 | B1* | 8/2023 | Palese .................. H04B 10/673 398/118 |
| 11,815,714 | B2 | 11/2023 | Kendrick et al. |
| 11,934,048 | B2 | 3/2024 | Palese et al. |
| 11,962,350 | B2 | 4/2024 | Palese et al. |
| 2006/0239312 | A1 | 10/2006 | Kewitsch et al. |
| 2007/0206958 | A1* | 9/2007 | Chen .................. H01Q 3/2676 398/183 |
| 2009/0091500 | A1 | 4/2009 | Haziza |
| 2013/0177319 | A1 | 7/2013 | Middleton et al. |
| 2014/0376001 | A1 | 12/2014 | Swanson |
| 2015/0293224 | A1 | 10/2015 | Eldada et al. |
| 2015/0303986 | A1* | 10/2015 | Shi ...................... H01Q 3/2676 375/130 |
| 2015/0346340 | A1 | 12/2015 | Yaacobi et al. |
| 2016/0033766 | A1* | 2/2016 | Hajimiri .............. G02B 5/1842 348/322 |
| 2016/0094016 | A1 | 3/2016 | Beach et al. |
| 2017/0016990 | A1* | 1/2017 | Yaacobi ................ G01S 7/4813 |
| 2017/0234984 | A1 | 8/2017 | Khial et al. |
| 2017/0324162 | A1 | 11/2017 | Khachaturian |
| 2018/0026721 | A1 | 1/2018 | Bock et al. |
| 2018/0039154 | A1* | 2/2018 | Hashemi .............. G02F 1/2955 |
| 2018/0107091 | A1* | 4/2018 | Hosseini .............. G02F 1/292 |
| 2018/0123699 | A1 | 5/2018 | Fatemi et al. |
| 2019/0229808 | A1* | 7/2019 | Calhoun ............ H01Q 21/0006 |
| 2019/0253125 | A1 | 8/2019 | Apaydin et al. |
| 2019/0260123 | A1* | 8/2019 | Poulton ................ H01Q 3/2676 |
| 2019/0267708 | A1 | 8/2019 | Tennant et al. |
| 2020/0192179 | A1 | 6/2020 | Hajimiri |
| 2020/0284910 | A1 | 9/2020 | Yaacobi et al. |
| 2020/0348544 | A1 | 11/2020 | Levy |
| 2020/0403697 | A1 | 12/2020 | Perlot |
| 2021/0006333 | A1 | 1/2021 | Morton et al. |
| 2021/0057817 | A1 | 2/2021 | Lenive |
| 2021/0067251 | A1 | 3/2021 | Park et al. |
| 2021/0149227 | A1 | 5/2021 | Lee et al. |
| 2022/0019019 | A1 | 1/2022 | Kendrick et al. |
| 2022/0252908 | A1 | 8/2022 | Inamdar et al. |
| 2022/0342201 | A1* | 10/2022 | Gleason .................. G02B 26/12 |
| 2023/0093054 | A1 | 3/2023 | Gunzelmann et al. |

FOREIGN PATENT DOCUMENTS

| | | | |
|---|---|---|---|
| KR | 20150104137 A | * | 9/2015 |
| WO | WO-02079871 A2 | * 10/2002 | ......... G02F 1/13471 |

OTHER PUBLICATIONS

Blumenthal, "Silicon Nitride in Silicon Photonics", Proceedings of the IEEE, vol. 106, Issue 12, Dec. 2018, 23 pages.

Bonod et al., "Full-silica metameaterial wave plate for high-intensity UV lasers," Optica, Research Article, vol. 8, No. 11, Nov. 2021, 8 pages.

Creedon et al., "High efficiency coherent beam combining of semiconductor optical amplifiers," Optics Letters, vol. 37, No. 23, Dec. 2012, 3 pages.

Essiambre et al., "Capacity Limits of Optical Fiber Networks," Journal of Lightwave Technology, vol. 28, No. 4, Feb. 2010, 40 pages.

Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.

He et al., "Review of Photonic Integrated Optical Phased Arrays for Space Optical Communication," IEEE Access, vol. 8, Oct. 2020, 16 pages.

Heidel et al., "A Review of Electronic-Photonic Heterogeneous Integration at DARPA," IEEE Journal of Selected Topics in Quantum Electronics, vol. 22, No. 6, Nov. 2016, 9 pages.

Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.

Komljenovic et al., "On-chip calibration and control of optical phased arrays," Optics Express, vol. 26, No. 3, Jan. 2018, 12 pages.

Larocque et al., "Beam steering with ultracompact and low-power silicon resonator phase shifters," Optics Express, vol. 27, No. 24, Nov. 2019, 16 pages.

Li et al., "Fast Optical Phased Array Calibration Technique for Random Phase Modulation LiDAR," IEEE Photonics Journal, vol. 11, No. 1, Feb. 2019, 10 pages.

Marron et al., "Atmospheric turbulence correction using digital holographic detection: experimental results," Optics Express, vol. 17, No. 14, Jul. 2009, 14 pages.

Marron et al., "Extended-range digital holographic imaging," Proc. of SPIE, vol. 7684 76841J, 2010, 6 pages.

Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.

Orcutt et al., "Open foundry platform for high-performance electronic-photonic integration," Optics Express, vol. 20, No. 11, May 2012, 11 pages.

Sayyah et al., "Two-dimensional pseudo-random optical phased array based on tandem optical injection locking of vertical cavity surface emitting lasers," Optics Express, vol. 23, No. 15, Jul. 2015, 12 pages.

Sousa et al., "Adaptive Beamforming Applied to OFDM Systems," MDPI Article, Sensors, 18(10), 2018, 15 pages.

Stralka et al., "OFDM-based Wideband Phased Array Radar Architecture," IEEE Radar Conference—Proceedings, 2008, 6 pages.

Wikipedia, "Orthogonal frequency-division multiplexing," Dec. 2020, 26 pages.

Zhang et al., "Phase Calibration of On-Chip Optical Phased Arrays via Interference Technique," IEEE Photonics Journal, vol. 12, No. 2, Apr. 2020, 11 pages.

* cited by examiner

PHOTONIC INTEGRATED CIRCUIT-BASED POLARIZATION-INDEPENDENT OPTICAL DEVICES

TECHNICAL FIELD

This disclosure relates generally to optical systems. More specifically, this disclosure relates to photonic integrated circuit-based polarization-independent optical devices.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to photonic integrated circuit-based polarization-independent optical devices.

In a first embodiment, an apparatus includes a photonic integrated circuit having an optical phased array, where the optical phased array includes multiple unit cells. Each unit cell includes an antenna element configured to transmit or receive optical signals having a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

In a second embodiment, a system includes multiple optical devices configured to engage in optical communication. Each optical device includes a photonic integrated circuit having an optical phased array, where the optical phased array includes multiple unit cells. Each unit cell includes an antenna element configured to transmit or receive optical signals having a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

In a third embodiment, a method includes using an optical phased array of a photonic integrated circuit to transmit or receive optical signals, where the optical phased array includes multiple unit cells. Each unit cell includes an antenna element configured to transmit or receive the optical signals, where the optical signals have a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
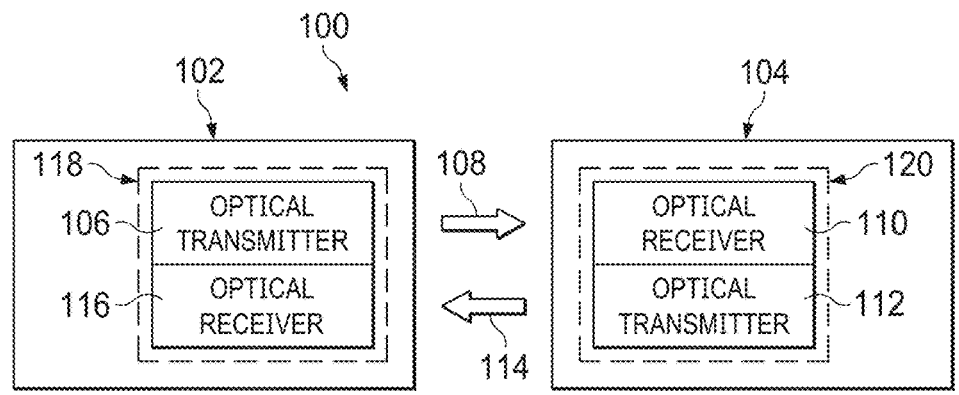
FIG. 1 illustrates an example system supporting photonic integrated circuit-based polarization-independent communication according to this disclosure.

FIGS. 1 through 14, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

Unfortunately, nano-antennas used in typical optical phased arrays are able to transmit or receive light using a single polarization (namely S polarization or P polarization). This can cause problems with optical communication links in which an optical transmitter and an optical receiver are able to rotate relative to one another or where propagation of optical signals depolarizes the optical signals (such as when the optical signals propagate through the atmosphere). The relative rotation between an optical transmitter and an optical receiver can occur in virtually all applications except those involving fixed ground-to-fixed ground terminals, which severely limits use of these optical phased arrays. While it may be possible to utilize two separate nano-antenna arrays (one for each polarization) in a system, this increases the size, weight, power, and cost (SWaP-C) of the overall system.

This disclosure provides optical devices that support photonic integrated circuit-based polarization-independent communication. As described in more detail below, a photonic integrated circuit includes multiple unit cells, and each unit cell provides polarization-independent operation. For example, each unit cell may include or be associated with a quarter waveplate, which can transform linearly-polarized light into circularly-polarized light and transform circularly-polarized light into linearly-polarized light. As a result, components within photonic integrated circuits of optical devices can be configured to generate or process linearly-polarized light, while circularly-polarized light can be exchanged between the optical devices.

This helps to provide polarization diversity and polarization-independent operation for the unit cells, which allows the photonic integrated circuits to be used effectively regardless of the relative rotation between an optical transmitter and an optical receiver. Moreover, this can be achieved using a single array of unit cells, which can provide size, weight, power, and cost reductions compared to the use of multiple nano-antenna arrays. In addition, in some embodiments, these nano-antenna arrays may be fabricated using conventional manufacturing techniques, such as complementary metal oxide semiconductor (CMOS) silicon fabrication techniques, which can help to further reduce the costs of the nano-antenna arrays.

FIG. 1 illustrates an example system 100 supporting photonic integrated circuit-based polarization-independent communication according to this disclosure. As shown in FIG. 1, the system 100 includes two nodes 102 and 104 that communicate with one another optically. Each node 102 and 104 represents a ground-, air-, or space-based system that can transmit and/or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, and/or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, and/or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes. As described in more detail below, each of the optical transmitters 106 and 112, optical receivers 110 and 116, or optical transceivers 118 and 120 includes at least one PIC-based optical phased array with unit cells supporting polarization-independent operation, which can be used to transmit and/or receive the optical signals 108 and/or 114.

In many applications, at least one node 102 or 104 may rotate relative to the other node 104 or 102 during operation. As a result, the angular orientation of each node 102 and 104 may vary over time relative to the other node 104 and 102. If the optical transmitters 106, 112, optical receivers 110, 116, or optical transceivers 118, 120 of the nodes 102 and 104 include nano-antenna arrays that are sensitive to a single polarization of light, this relative rotation of the nodes 102 and 104 can interfere with (or even prevent) effective optical communication between the nodes 102 and 104. According to this disclosure, the optical transmitters 106, 112, optical receivers 110, 116, or optical transceivers 118, 120 may be implemented using photonic integrated circuits with unit cells supporting polarization-independent operation as described in more detail below. This enables effective optical communication between the nodes 102 and 104 regardless of changes in orientation of the nodes 102 and 104 with respect to each other. In some embodiments, it is also possible to communicate multiple optical signals 108 or 114 between the nodes 102 and 104 in a single direction at the same time, such as when the nodes 102 and 104 have a substantially 0° relative rotation with respect to each other.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting photonic integrated circuit-based polarization-independent communication, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
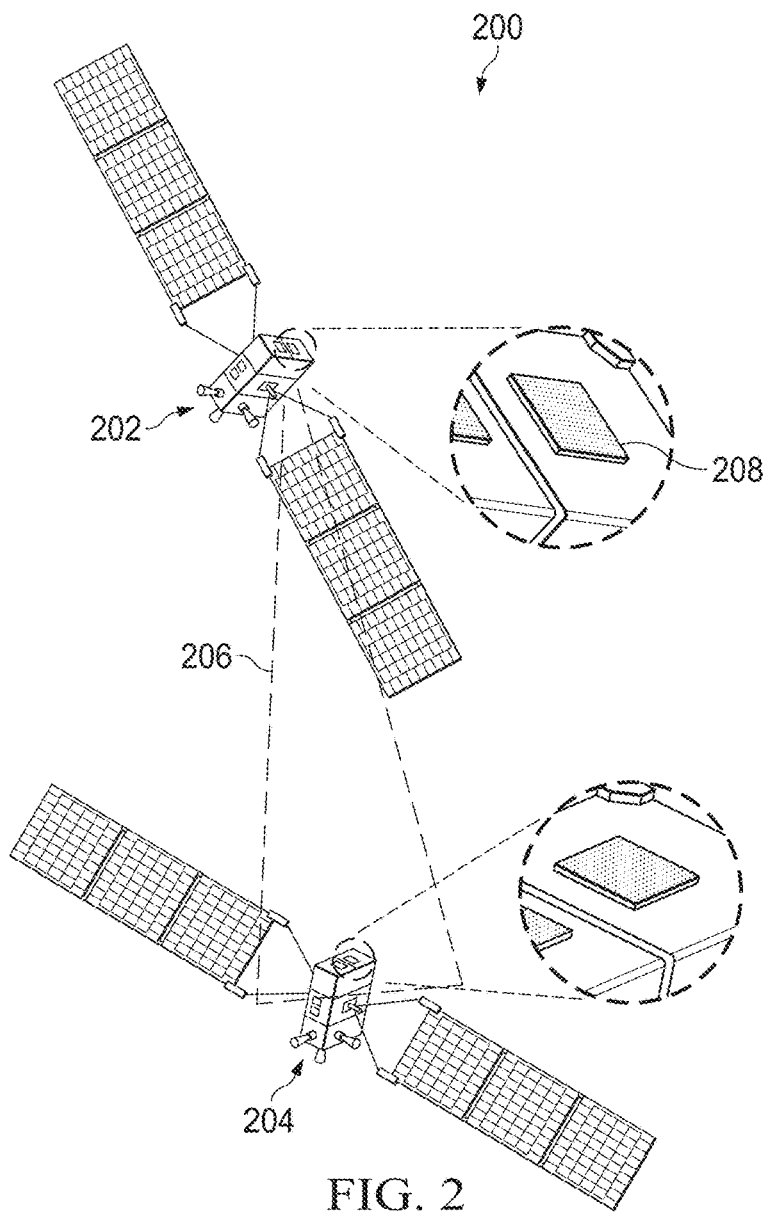
FIG. 2 illustrates a specific example system supporting photonic integrated circuit-based polarization-independent communication according to this disclosure.

FIG. 2 illustrates a specific example system 200 supporting photonic integrated circuit-based polarization-independent communication according to this disclosure. As shown in FIG. 2, the system 200 includes two satellites 202 and 204 that can engage in unidirectional or bidirectional communication with one another. In this particular example, the satellite 202 is shown as transmitting an optical signal 206 towards the satellite 204. Each satellite 202 and 204 includes one or more PIC-based optical transmitters, receivers, or transceivers 208 that enable the satellites 202 and 204 to engage in free-space optical communications. Thus, the satellites 202 and 204 may represent specific implementations of the nodes 102 and 104 described above, and the PIC-based transmitters, receivers, or transceivers 208 may represent specific implementations of the optical transmitters 106, 112, optical receivers 110, 116, or optical transceivers 118, 120 described above. Note that the satellites 202 and 204 shown here may represent any suitable satellites that engage in optical communications. For example, the satellites 202 and 204 may represent satellites in a proliferated low Earth orbit constellation, although other types of satellites in other orbits or constellations may be used.

As can be seen in FIG. 2, the satellites 202 and 204 are generally free to rotate relative to one another. In other words, the angular orientation of each satellite 202 and 204 may vary over time relative to the other satellite 204 and 202. If each PIC-based transmitter, receiver, or transceiver 208 includes a nano-antenna array that is sensitive to a single polarization of light, this relative rotation of the satellites 202 and 204 can interfere with or prevent effective optical communication between the satellites 202 and 204. According to this disclosure, the PIC-based transmitters, receivers, or transceivers 208 may be implemented using photonic integrated circuits with unit cells supporting polarization-independent operation as described in more detail below. This enables effective optical communication between the satellites 202 and 204 regardless of changes in orientation of the satellites 202 and 204 with respect to each other. In some embodiments, it is also possible to send multiple optical signals 206 between the satellites 202 and 204 in a single direction at the same time, such as when the satellites 202 and 204 have a substantially 0° relative rotation with respect to each other.

Although FIG. 2 illustrates one specific example of a system 200 supporting photonic integrated circuit-based polarization-independent communication, various changes may be made to FIG. 2. For example, while only two satellites 202 and 204 are shown here, the system 200 may include any suitable number of satellites that engage in any suitable unidirectional, bidirectional, or other communications or other interactions with each other. Also, each satellite of the system 200 may include any suitable number of optical transmitters, receivers, or transceivers that communicate or otherwise use any number of optical signals. In addition, while the example system 200 shown here uses satellites, other systems may use other types of nodes that engage in optical communications. As a specific example, nodes using PIC-based optical transmitters, receivers, or transceivers may be used in a ground-based free-space optical communication system to support mid- and last-mile communications.

Figure 3A:
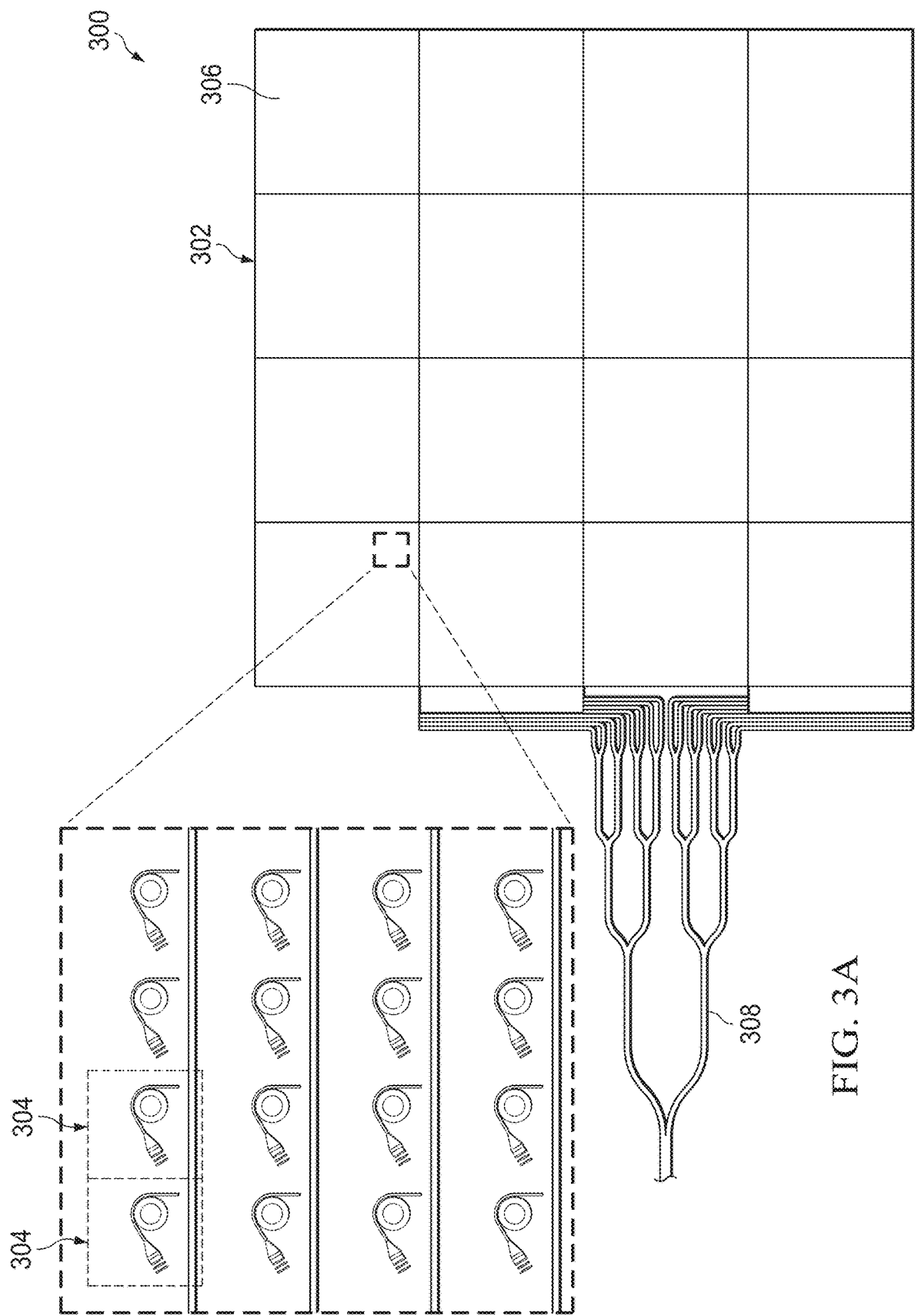
FIGS. 3A and 3B illustrate an example photonic integrated circuit-based optical device supporting polarization-independent communication according to this disclosure.
Figure 3B:
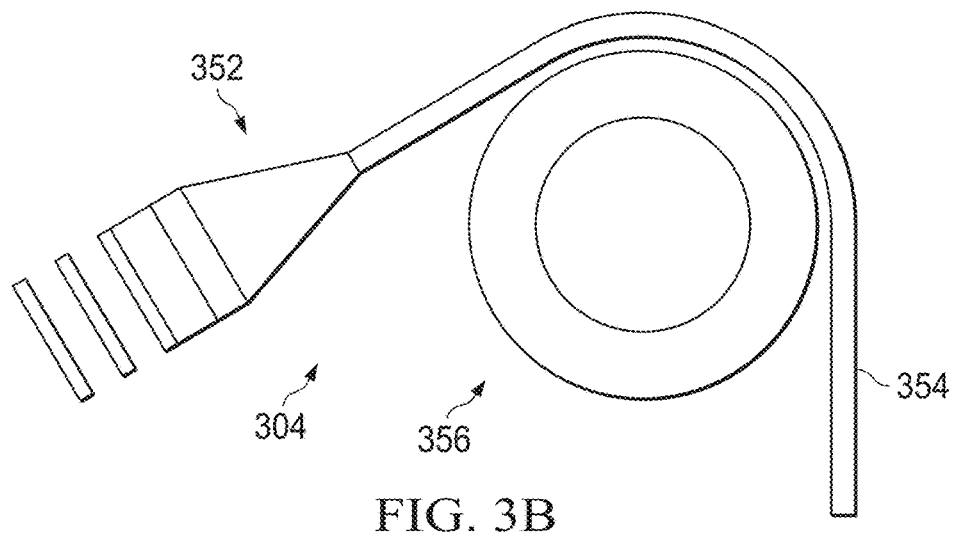

FIGS. 3A and 3B illustrate an example photonic integrated circuit-based optical device 300 supporting polarization-independent communication according to this disclosure. For ease of explanation, the optical device 300 may be described as being used to at least partially implement each of the optical transmitters 106, 112, optical receivers 110, 116, or optical transceivers 118, 120 in FIG. 1 or each of the optical transmitters, receivers, or transceivers 208 of FIG. 2. However, the optical device 300 may be used in any other suitable device and in any other suitable system.

As shown in FIG. 3A, the optical device 300 includes a PIC-based optical phased array 302, where the optical phased array 302 includes a large number of unit cells 304. Each unit cell 304 is configured to transmit and/or receive one or more optical signals. The optical phased array 302 can include any suitable number of unit cells 304, possibly up to and including a very large number of unit cells 304. In some embodiments, for example, the optical phased array 302 may include an array of unit cells 304 up to a size of 1024×1024 (meaning over one million unit cells 304) or even larger. Also, the optical phased array 302 may include multiple groups 306 of unit cells 304, where the unit cells 304 in each group 306 are fed an outgoing optical signal or are used to generate an incoming optical signal. In some embodiments, for example, the optical phased array 302 may include sixteen groups 306 of unit cells 304 arranged in a 4×4 pattern, although other numbers and arrangements of groups 306 of unit cells 304 may be used. The size of the optical phased array 302 is based, at least in part, on the number and size of the unit cells 304 and the number and arrangement of the groups 306. As a particular example, in some cases, the optical phased array 302 may be square with edges of about 1.6 mm in length. However, the optical phased array 302 may be scaled to smaller or larger sizes as needed or desired.

A feed network 308 is used to split outgoing optical signals for transmission by the optical phased array 302 and/or to combine incoming optical signals received by the optical phased array 302. For example, the feed network 308 may include a collection of splitters/combiners that can divide optical signals flowing in one direction through the feed network 308 and combine optical signals flowing in the opposite direction through the feed network 308. In some cases, the feed network 308 can be designed to feed optical signals to and/or receive optical signals from the groups 306 of unit cells 304. Additional components within the optical phased array 302 (such as within each group 306 of unit cells 304) may be used to provide optical signals to and/or receive optical signals from the individual unit cells 304 within the optical phased array 302. The feed network 308 includes any suitable structures configured to distribute and/or combine optical signals. While a specific configuration of a feed network 308 is shown here, the actual design of the feed network 308 can vary based on a number of factors, such as the design of the optical phased array 302.

As shown in FIG. 3B, each unit cell 304 includes an antenna element 352, which is configured to physically transmit or receive one or more optical signals to or from one or more external devices or systems. For example, each antenna element 352 may represent a nanophotonic antenna or other antenna element that transmits or receives at least one optical signal, along with one or more lenses or other optical devices configured to focus or otherwise process the at least one optical signal. Depending on the implementation, the antenna element 352 may sometimes be referred to as an emitter in a transmitting array or a receiver in a receiving array. Each antenna element 352 may have any suitable size, shape, and dimensions. In some cases, the emitting/receiving surface of the antenna element 352 may be about 3 μm to about 4 μm in diameter.

Each antenna element 352 here is coupled to a signal pathway 354. The signal pathways 354 are configured to transport optical signals to and/or from the antenna elements 352. For example, the signal pathways 354 can provide optical signals to the antenna elements 352 for transmission. Also or alternatively, the signal pathways 354 can provide optical signals received by the antenna elements 352 to optical detectors or other components for processing. Each signal pathway 354 includes any suitable structure configured to transport optical signals, such as an optical waveguide. Note that only a portion of the signal pathway 354 may be shown in FIG. 3B, since a signal pathway 354 can vary based on how the associated unit cell 304 is designed and positioned within the optical phased array 302.

A modulator 356 is provided for each antenna element 352 and is used (among other things) to control the phases of optical signals transmitted or received by the associated antenna element 352. For example, when the antenna elements 352 are transmitting, the modulators 356 can be used to achieve desired phases of outgoing optical signals in order to perform beam forming or beam steering. When the antenna elements 352 are receiving, the modulators 356 can be used to apply phase control to the incoming wavefront of received optical signals in order to decompose or reconstruct the wavefront. Each modulator 356 includes any suitable structure configured to modulate the phase of an optical signal, such as a resonant micro-ring modulator or a PN junction micro-ring modulator. In some cases, each modulator 356 may be a resonant micro-ring modulator that is about 5.5 μm to about 6 μm in diameter, although modulators of other sizes may be used here.

Each unit cell 304 shown here may have any suitable size, shape, and dimensions. In some embodiments, each unit cell 304 is substantially square in shape and has dimensions of about 12 μm by about 12 μm. However, the overall size, shape, and dimensions of each unit cell 304 can vary based on various factors, such as the size, shape, dimensions, and arrangement of its individual components. Note that the path lengths associated with the antenna elements 352 in the unit cells 304 can be closely matched to one another. In some cases, the path lengths can be matched at the sub-wavelength level. Along with correlated S and P polarization control that can be achieved using the modulators 356, this allows for coherent recombination of optical signals (such as when light at the TE0 or TM0 waveguide mode is used).

Although FIGS. 3A and 3B illustrate one example of a photonic integrated circuit-based optical device 300 supporting polarization-independent communication, various changes may be made to FIGS. 3A and 3B. For example, the optical phased array 302 may have any other suitable size and shape, and any other suitable feed network 308 may be used. Also, while the feed network 308 is shown here as residing next to the optical phased array 302, the feed network 308 may be located in any other suitable position(s), such as under the optical phased array 302.

Figure 4:
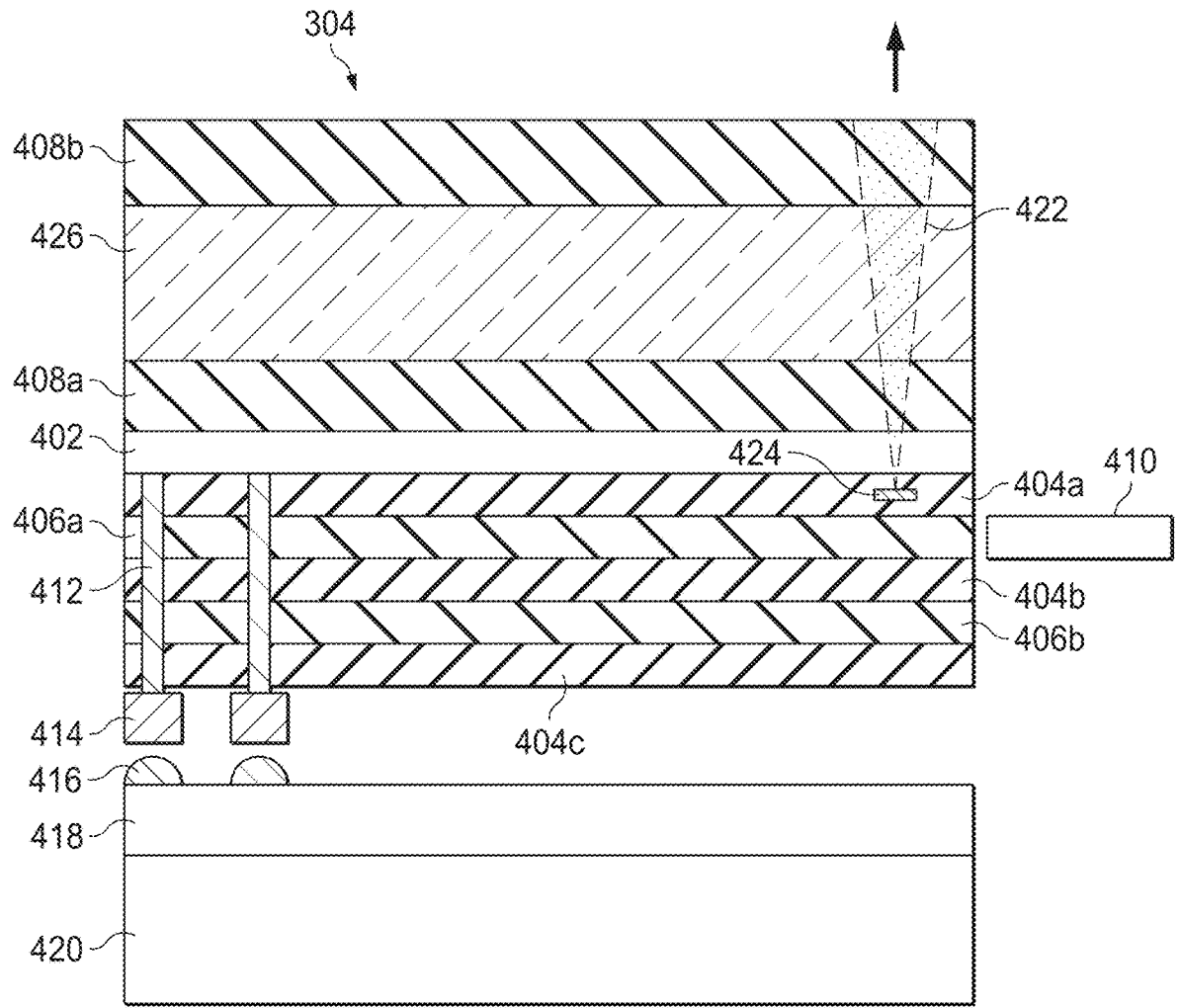
FIG. 4 illustrates an example cross-section of a unit cell supporting photonic integrated circuit-based polarization-independent communication according to this disclosure.

FIG. 4 illustrates an example cross-section of a unit cell 304 supporting photonic integrated circuit-based polarization-independent communication according to this disclosure. For ease of explanation, the unit cell 304 of FIG. 4 may be described as being used in the optical device 300 in order to at least partially implement each of the optical transmitters 106, 112, optical receivers 110, 116, or optical transceivers 118, 120 in FIG. 1 or each of the optical transmitters, receivers, or transceivers 208 of FIG. 2. However, the unit cell 304 may be used in any other suitable optical device or other device and in any other suitable system.

As shown in FIG. 4, each unit cell 304 may be fabricated as a multi-layer structure that uses components in various layers to implement the desired functions of the unit cell 304. In this example, the multi-layer structure includes a photonics layer 402, which represents the layer in which various photonic functions (such as waveguides and possibly antennas) can be fabricated. The photonics layer 402 may be formed using any suitable material(s), such as silicon. The photonics layer 402 may also be formed in any suitable manner, such as by depositing material(s) on another layer and etching or otherwise processing the material(s). In addition, the photonics layer 402 may have any suitable dimensions, such as a thickness of about 220 nm.

Various layers 404a-404c and 406a-406b are positioned on one side of the photonics layer 402 and can provide electrical insulation or perform other functions. Each of the layers 404a-404c and 406a-406b may be formed using any suitable material(s). In some embodiments, each of the layers 404a-404c may be formed using silicon dioxide or other dielectric material, and each of the layers 406a-406b may be formed using silicon nitride. Each of the layers 404a-404c and 406a-406b may also be formed in any suitable manner, such as by depositing material(s) on another layer and etching or otherwise processing the material(s). In addition, each of the layers 404a-404c and 406a-406b may have any suitable dimensions. In some embodiments, the layer 404a may have a thickness of about 100 nm to about 2000 nm, each of the layers 404b-404c may have a thickness of about 100 nm, and each of the layers 406a-406b may have a thickness of about 220 nm.

Various layers 408a-408b are also positioned on the opposite side of the photonics layer 402 and can provide electrical insulation or perform other functions. Each of the layers 408a-408b may be formed using any suitable material(s). In some embodiments, each of the layers 408a-408b may be formed using silicon dioxide or other dielectric material. As a particular example, the layer 408a may represent a buried oxide (BOX) layer, and the layer 408b may represent an optional cap. Each of the layers 408a-408b may also be formed in any suitable manner, such as by depositing material(s) on another layer and etching or otherwise processing the material(s). In addition, each of the layers 408a-408b may have any suitable dimensions. In some embodiments, the layer 408a may have a thickness of about 100 nm to about 2000 nm.

Depending on the implementation, the antenna element 352 of the unit cell 304 may be fabricated in the photonics layer 402 or in one or more of the layers 406a-406b. In this example, it is assumed that the antenna element of the unit cell 304 is fabricated in the photonics layer 402. Optical signals are provided to and/or received from the unit cell 304 using an optical fiber 410, which may represent an optical waveguide or other suitable structure. Electrical signals used by the unit cell 304 (such as signals for controlling the modulator of the unit cell 304) are provided to the unit cell 304 using one or more conductive vias 412. The one or more conductive vias 412 are electrically coupled to conductive pads 414, which may contact one or more solder bumps 416 (such as indium solder bumps) carried by an interposer layer 418. The layers 404c and 418 can be separated from one another by any suitable distance to accommodate the conductive pads 414, solder bumps 416, or other components, such as a distance of about 1110 nm. Note, however, that any other suitable mechanisms may be used to transport optical and electrical signals to and from the unit cell 304.

A carrier layer 420 represents a substrate or other layer of material that is used to carry the unit cell 304. The carrier layer 420 may be formed using any suitable material(s), such as silicon. The carrier layer 420 may also be formed in any suitable manner. In addition, the carrier layer 420 may have any suitable dimensions, such as a thickness of about 775 μm or more.

As shown in this particular example, the unit cell 304 may be configured to transmit and/or receive optical signals 422. The direction of transmission and/or reception upward in FIG. 4 is obtained using a reflector 424 that is included in the layer 404a (or another layer of the stack). With the reflector 424, the photonics layer 402 may transmit and/or receive the optical signals 422 through the top of the stack as shown in FIG. 4. Without the reflector 424, the photonics layer 402 may be configured to transmit and/or receive optical signals through the bottom of the stack as shown in FIG. 4. The reflector 424 may be formed using any suitable reflective material(s), such as one or more metals. The reflector 424 may also be formed in any suitable manner, such as by depositing material(s) on another layer and etching or otherwise processing the material(s). In addition, the reflector 424 may have any suitable dimensions, such as a length of about 100 nm to about 300 nm. Note, however, that the unit cell 304 may be configured to transmit and/or receive optical signals 422 in the same direction shown here without using a reflector 424.

A quarter waveplate 426 is positioned above the antenna element 352 of the unit cell 304, which may be formed in the photonics layer 402 or in one or more of the layers 406a-406b as noted above. The quarter waveplate 426 is configured to transform linearly-polarized light into circularly-polarized light and vice versa. Thus, the quarter waveplate 426 can transform linearly-polarized light received from the antenna element 352 into circularly-polarized light for outgoing transmission. The quarter waveplate 426 can also or alternatively transform incoming circularly-polarized light that is received into linearly-polarized light for reception by the antenna element 352. The quarter waveplate 426 may be formed using any suitable material(s), such as one or more birefringent materials. In some embodiments, the quarter waveplate 426 may be formed using quartz or one or more polymers. Also, the quarter waveplate 426 may be formed in any suitable manner, such as by depositing material(s) on another layer and etching or otherwise processing the material(s). In addition, the quarter waveplate 426 may have any suitable dimensions.

Note that while a single quarter waveplate 426 here is shown above the antenna element 352 of the unit cell 304, the single quarter waveplate 426 or another quarter waveplate may be positioned below the antenna element 352 of the unit cell 304 (if transmission/reception can occur in the opposite direction). Also note that while the quarter waveplate 426 here is shown as being formed using a flat layer of material, non-planar embodiments of the quarter waveplate 426 are possible. Example embodiments of the quarter waveplate 426 are described in more detail below.

In some embodiments, the quarter waveplate 426 can be implemented using a "zero order" waveplate, which means that the quarter waveplate 426 may have little if any operational variation based on temperature. In some cases, this type of quarter waveplate 426 may be formed using two "multiple order" quartz waveplates or other waveplates having their axes crossed, where one waveplate is stacked on top of the other.

Although FIG. 4 illustrates one example of a cross-section of a unit cell 304 supporting photonic integrated circuit-based polarization-independent communication, various changes may be made to FIG. 4. For example, various layers in the unit cells 304 may be combined, further subdivided, replicated, omitted, or rearranged and additional layers may be added according to particular needs. In general, the unit cells 304 described in this disclosure may be implemented in any suitable manner using any suitable layers of material. Also, the specific materials and dimensions of the various layers described above are for illustration only and can vary as needed or desired.

FIGS. 5A through 9 illustrate example quarter waveplates for use with unit cells 304 supporting photonic integrated circuit-based polarization-independent communication according to this disclosure. For ease of explanation, the quarter waveplates of FIGS. 5A through 9 may be described as being used in the optical device 300 in order to partially implement each of the optical transmitters 106, 112, optical receivers 110, 116, or optical transceivers 118, 120 in FIG. 1 or each of the optical transmitters, receivers, or transceivers 208 of FIG. 2. However, the quarter waveplates of FIGS. 5A through 9 may be used in any other suitable optical device or other device and in any other suitable system.

Figure 5A:
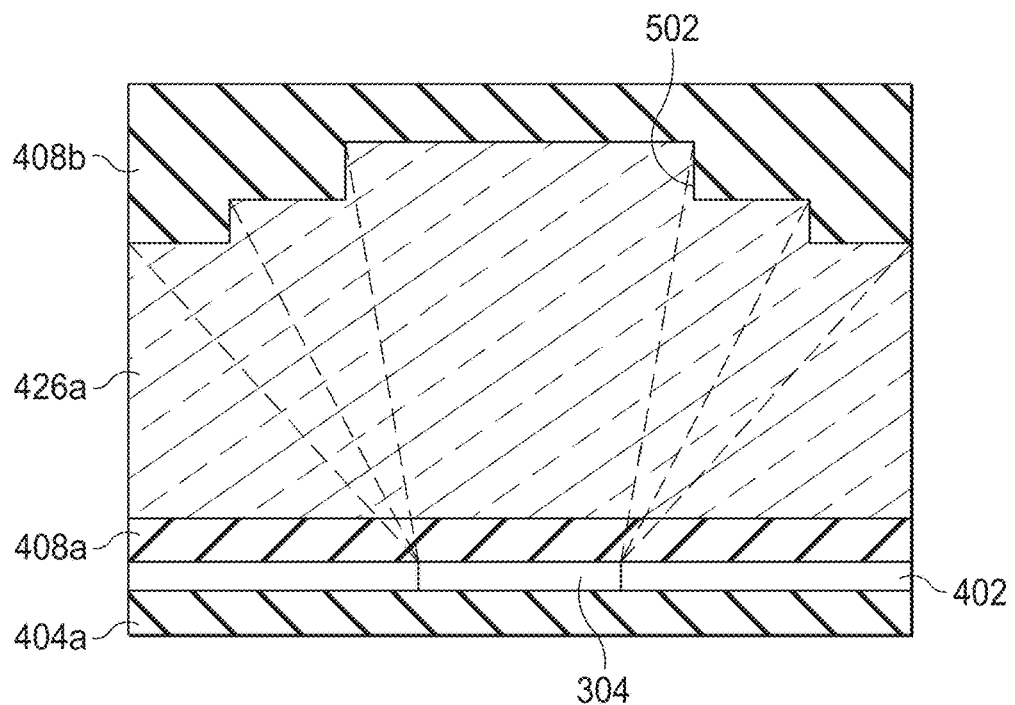
FIGS. 5A, 5B, 6, 7, 8A, 8B and 9 illustrate example quarter waveplates for use with unit cells supporting photonic integrated circuit-based polarization-independent communication according to this disclosure.
Figure 5B:
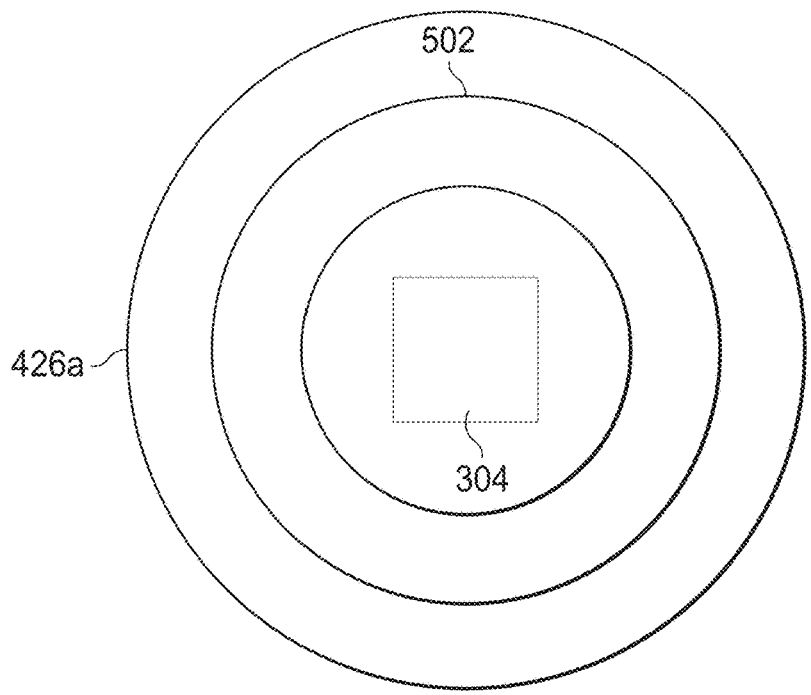

As shown in FIGS. 5A and 5B, a quarter waveplate 426a is shown as being fabricated using a non-planar structure within the stack of FIG. 4. Here, the non-planar structure of the quarter waveplate 426a includes various steps 502. In particular, FIG. 5A shows an example cross-section of the quarter waveplate 426a, and FIG. 5B shows an example top view of the quarter waveplate 426a. As can be seen here, the steps 502 of the quarter waveplate 426a define where the thickness of the quarter waveplate 426a (as measured up and down in FIG. 5A) changes abruptly. In this example, the thickness of the quarter waveplate 426a is largest in a middle or central portion of the quarter waveplate 426a, and the thickness of the quarter waveplate 426a decreases in steps moving outward towards the outer periphery of the quarter waveplate 426a. The quarter waveplate 426a here is shown as being substantially centered over the unit cell 304, and the steps 502 of the quarter waveplate 426a help to provide an increased field of view for the unit cell 304 (compared to a planar quarter waveplate). In this particular example, the quarter waveplate 426a is shown as having three steps 502, although the quarter waveplate 426a may have other suitable numbers of steps 502 as needed or desired.

In some embodiments, the quarter waveplate 426 may have a thickness that is based on the wavelength(s) of light to pass through the quarter waveplate 426. For example, the quarter waveplate 426a can have a maximum thickness of about 44 µm, which can provide for linear to circular polarization (and vice versa) at about 1550 nm of light. Also, using three steps 502 as shown here may be used to achieve an acceptance angle of about 23° and a bandwidth of about 42 nm. However, other thicknesses and step designs may be used to achieve other operational characteristics of the structure.

Figure 6:
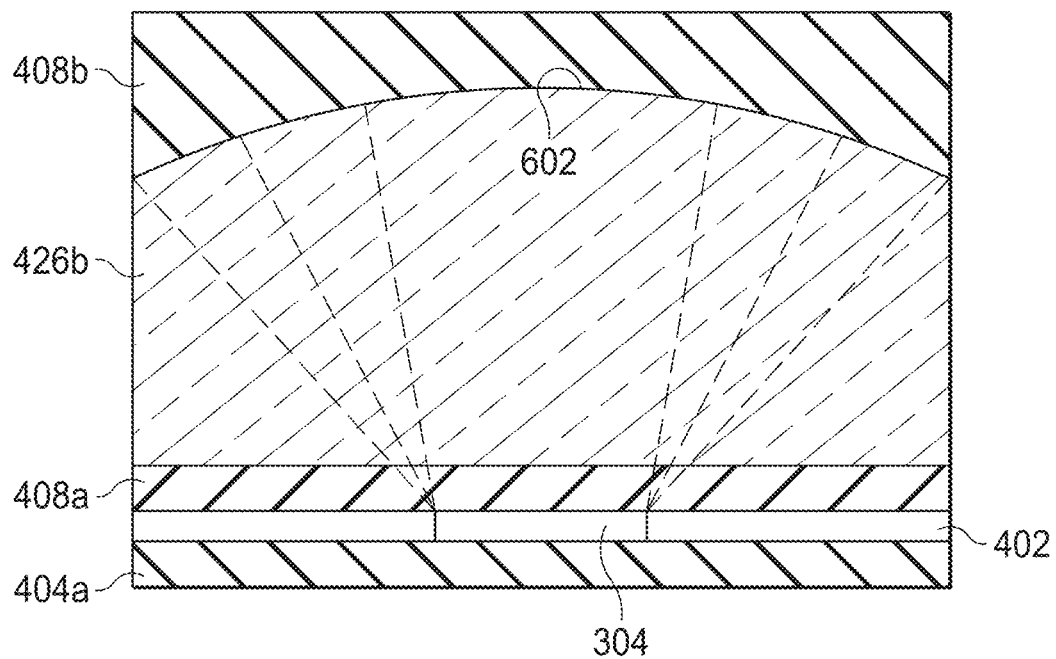

As shown in FIG. 6, a quarter waveplate 426b is shown as being fabricated using a non-planar structure that includes a smooth curved surface 602. Rather than having steps where the thickness of the quarter waveplate changes abruptly, the quarter waveplate 426b in this example includes the curved surface 602, meaning the thickness of the quarter waveplate 426b changes gradually. Again, this allows the thickness of the quarter waveplate 426b to change and provide an increased field of view for the unit cell 304 (compared to a planar quarter waveplate), and the quarter waveplate 426b here is shown as being centered over the unit cell 304.

Figure 7:
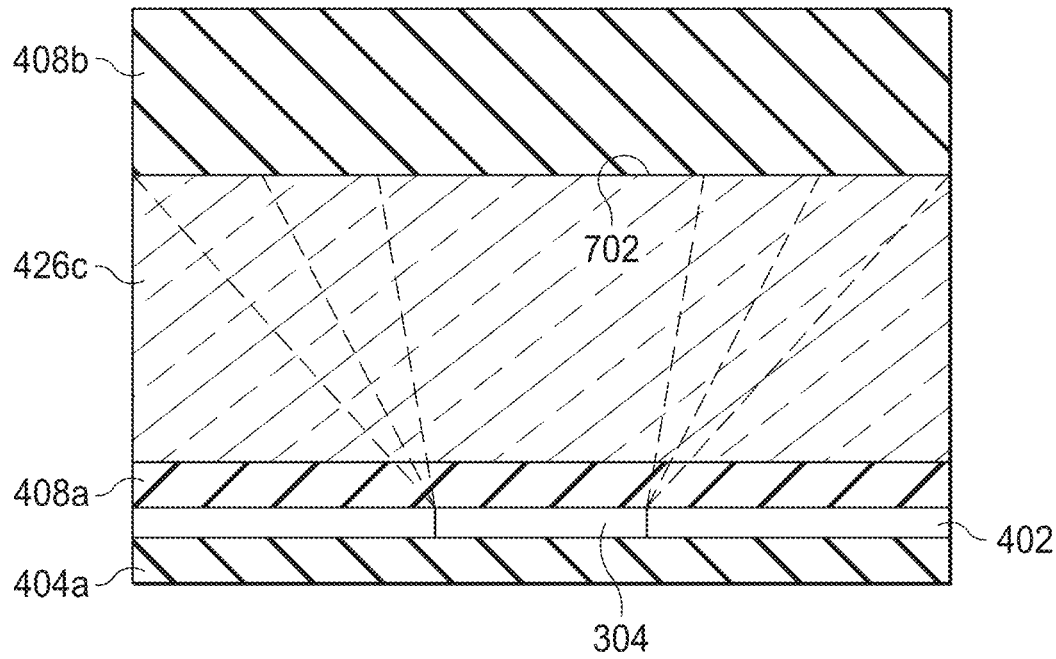

As shown in FIG. 7, a quarter waveplate 426c is shown as being fabricated using a planar structure that includes a substantially planar surface 702 (as opposed to a stepped or curved surface). As a result, the quarter waveplate 426c may have substantially the same thickness across the width of the quarter waveplate 426c. By forming the quarter waveplate 426c of a birefringent material, the quarter waveplate 426c is still able to convert between linear and circular polarizations. While the quarter waveplate 426c may provide a smaller field of view for the unit cell 304 (compared to a non-planar quarter waveplate), the quarter waveplate 426c can still be used effectively to enable communications between optical devices regardless of their angular orientation with respect to one another.

Figure 8A:
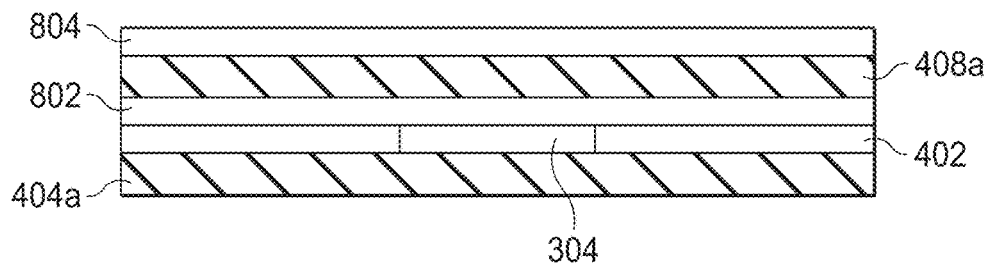
Figure 8B:
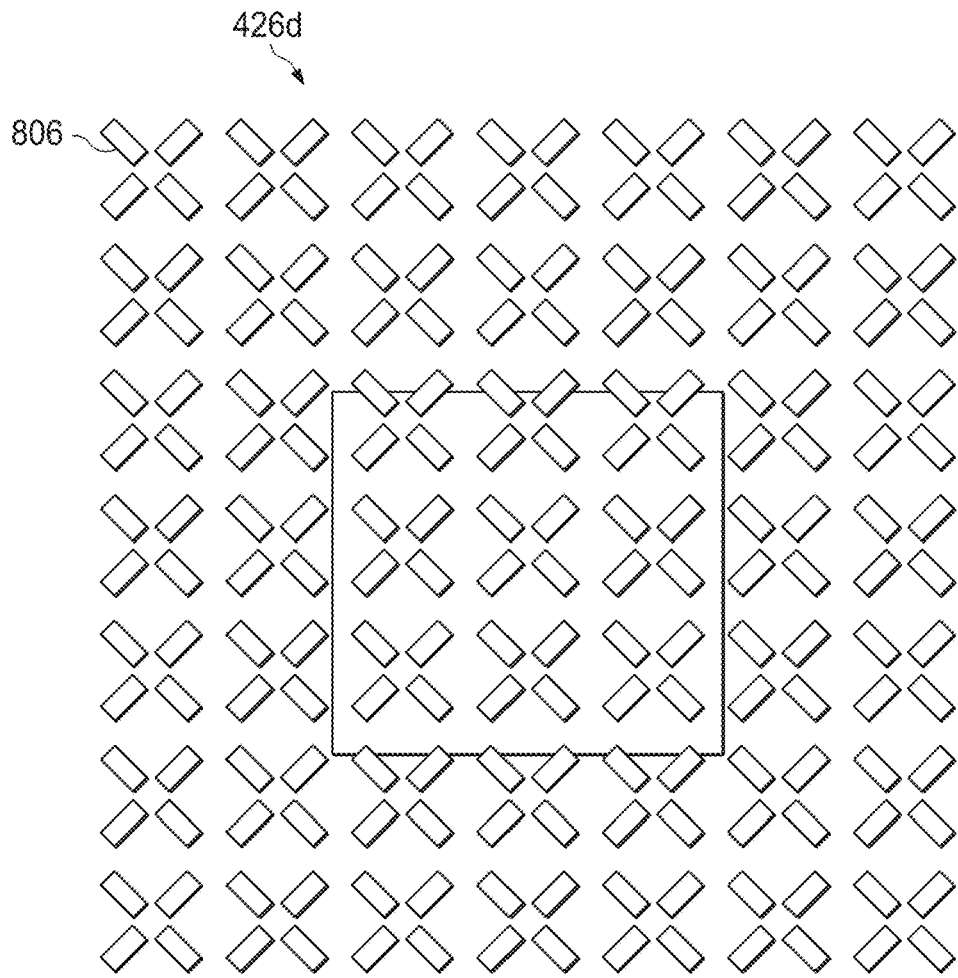

As shown in FIGS. 8A and 8B, the stack associated with the unit cell 304 may be somewhat altered from the stack described above. Here, a polysilicon layer 802 may be formed over the photonics layer 402, and the layer 408a may be formed over the polysilicon layer 802. Also, a silicon nitride layer 804 may be formed over the layer 408a. In some embodiments, each of the layers 802 and 804 may have a thickness of about 220 nm. Also, one of the layers 802, 408a, 804 may be patterned to form a metamaterial as shown in FIG. 8B. The metamaterial here represents a material that is engineered to have a repeating structure, namely pillars 806 in this particular example, to thereby form a quarter waveplate 426d. The metamaterial can be formed in any suitable manner, such as by patterning and etching the material forming the layer 802, 408a, or 804 in order to form the pillars 806. The pillars 806 can represent extremely small structures, such as pillars having a height of about 50 nm or less. Each of the pillars 806 can be oriented at about 45° relative to horizontal and vertical axes in FIG. 8B, and different pillars 806 can be oriented at about 90° relative to one another. This arrangement allows the metamaterial to convert between linear and circular polarizations.

Figure 9:
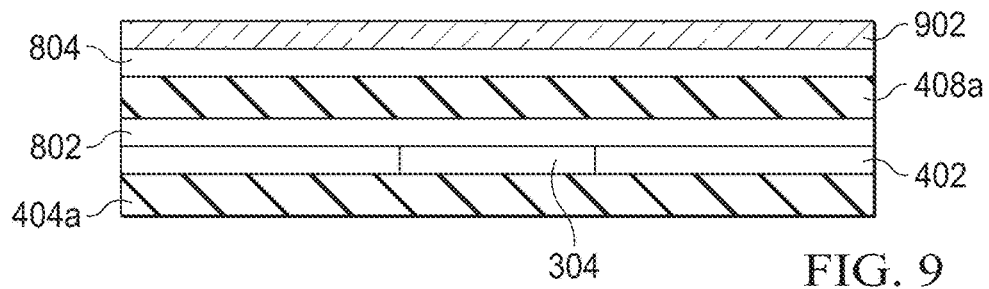

As shown in FIG. 9, the stack associated with the unit cell 304 may again be somewhat altered from the stack described above. Here, the polysilicon layer 802 may be formed over the photonics layer 402, and the silicon nitride layer 804 may be formed over the layer 408a. In addition, a polymer layer 902 can be formed over the silicon nitride layer 804. The polymer layer 902 represents a coating or other deposition of a birefringent polymer material that can function as a quarter waveplate 426e. The polymer layer 902 may include any suitable type of polymer material that can function as a quarter waveplate, such as a liquid crystal polymer material. The polymer layer 902 can be formed in any suitable manner, such as by depositing the polymer material on an underlying layer and processing the polymer material as needed or desired. The polymer layer 902 may also have any suitable dimensions, such as a thickness that provides linear-to-circular polarization conversion and vice versa at a desired wavelength or in a desired wavelength range.

Although FIGS. 5A through 9 illustrate examples of quarter waveplates for use with unit cells 304 supporting photonic integrated circuit-based polarization-independent communication, various changes may be made to FIGS. 5A through 9. For example, quarter waveplates may be implemented for unit cells of a photonic integrated circuit in any other suitable manner.

Depending on the implementation, transmission and reception of optical signals may occur through a single shared aperture (such as when one or more optical phased arrays 302 have a common aperture) or through separate apertures (such as when multiple optical phased arrays 302 have different apertures). When a single shared aperture is used, the transmit and receive wavelengths can be separated by a suitable amount in order to allow concurrent transmission and reception of optical signals. For example, the transmit and receive wavelengths can be separated by the free spectral range of the modulators 356 used in the unit cells 304 of the optical phased array 302, which can help to reduce or minimize transmit backscatter into the receiver's detector. In some cases, a 40 nm separation between the transmit and receive wavelengths may be adequate. However, other suitable separations between the transmit and receive wavelengths may be used depending on, among other things, the design of the modulators 356 in the unit cells 304. For instance, the free spectral range of the modulators 356 (and therefore the separation between the transmit and receive wavelengths) can vary based on a number of factors, such as the spacing or diameter of the modulators 356 or the index of refraction of the material(s) forming the modulators 356. Wavelength separation can also be supported in other ways, such as by using on-chip Bragg gratings.

Note that the ability to change the phases of optical signals using the modulators 356 in the unit cells 304 of the optical phased array 302 may support other functions in addition to the beam forming, beam steering, or wavefront reconstruction operations mentioned above. For example, atmospheric phase distortions are known to affect optical transmissions. Various mechanisms are known for measuring atmospheric phase distortions, and these measured phase distortions may be used to adjust the phases provided by the modulators 356. For instance, the phase shifts provided by the modulators 356 may be adjusted to provide corrections to the measured atmospheric phase distortions. Other types of adaptive corrections may also be made by adjusting the phases of the modulators 356, such as tip/tilt correction. Effectively, the modulators 356 in the optical phased array 302 can be used to provide an adaptive optic function. In some embodiments, the adaptive optic function can be used to compensate for both spatial and depolarization effects.

Also note that, as described above, the modulators 356 may be implemented in various ways. In some embodiments, optical phase shifts occur in each of the unit cells 304 by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 μW each).

Figure 10:
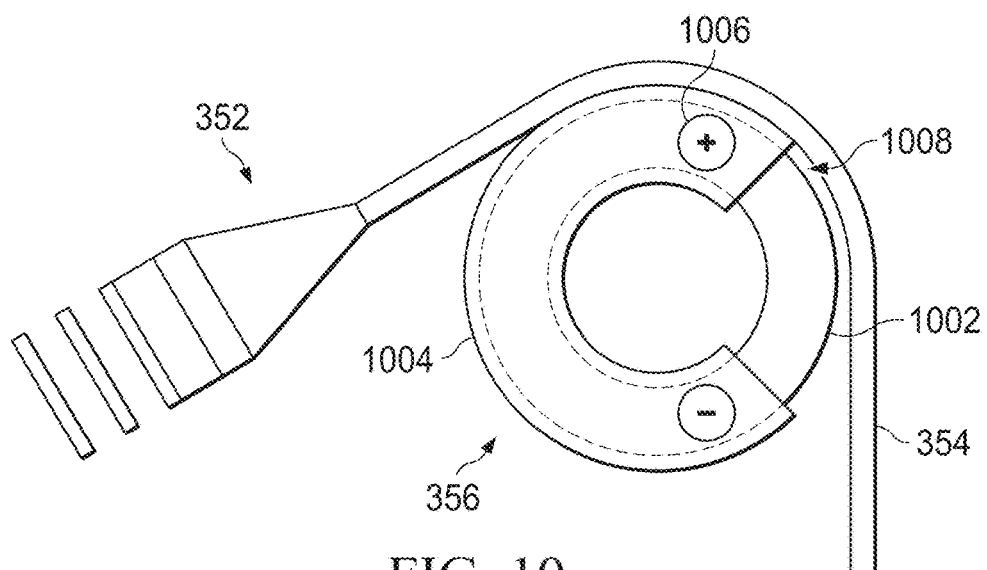
FIGS. 10 and 11 illustrate example modulators in unit cells of an optical phased array according to this disclosure.
Figure 11:
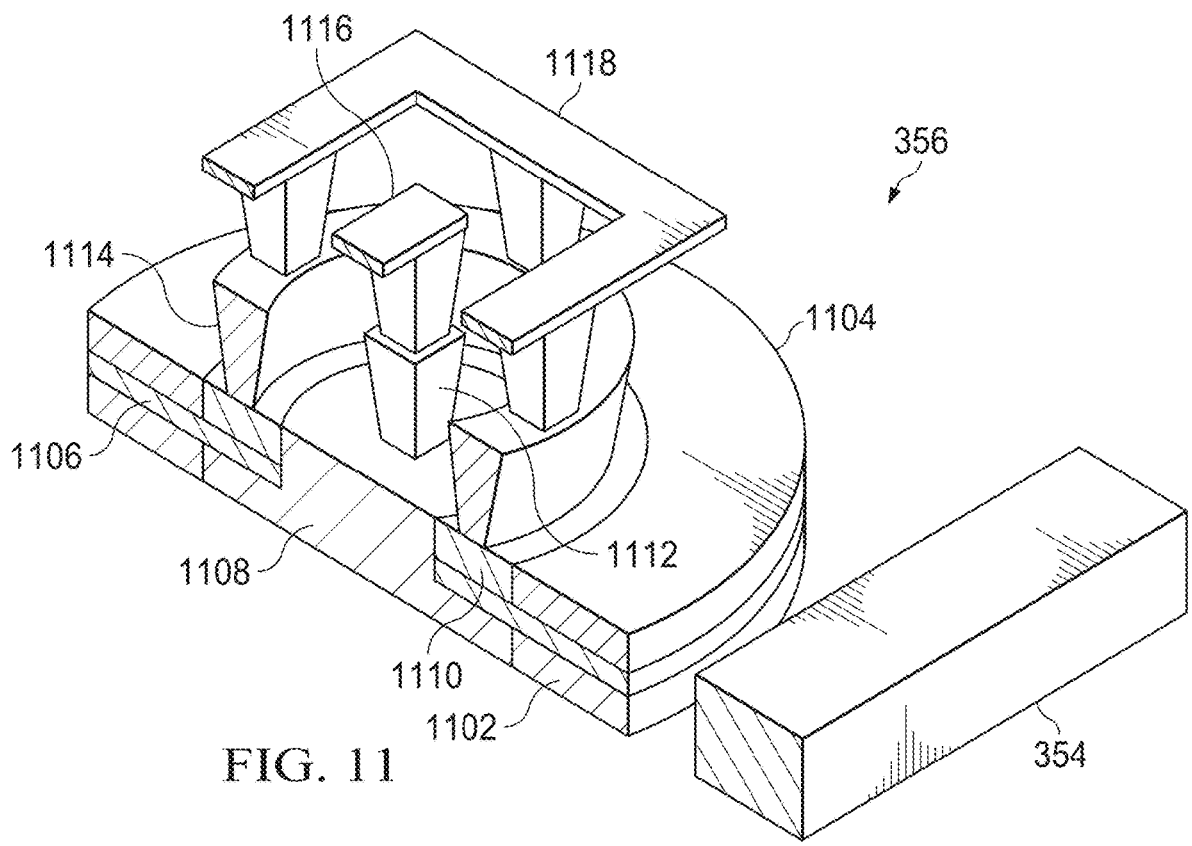

FIGS. 10 and 11 illustrate example modulators 356 in unit cells 304 of an optical phased array 302 according to this disclosure. As shown in FIG. 10, the modulator 356 here represents a thermal resonator that is implemented using a micro-ring resonator 1002 and a heater 1004 positioned above or otherwise near the micro-ring resonator 1002. The micro-ring resonator 1002 resonates based on an optical signal flowing through the associated signal pathway 354. Varying the temperature of the micro-ring resonator 1002 alters the resonance wavelength of the micro-ring resonator 1002, thereby changing the phase of the optical signal flowing through the signal pathway 354. Voltages can be applied to two electrical contacts 1006 of the heater 1004 in order to create the desired temperature change and therefore implement the desired phase shift of the optical signal flowing through the signal pathway 354. Different voltages applied to the heater 1004 can cause different phase shifts to occur in the modulator 356.

The micro-ring resonator 1002 may be formed from any suitable material(s), such as silicon, and in any suitable manner. The heater 1004 may be formed from any suitable material(s), such as one or more metals, and in any suitable manner. The micro-ring resonator 1002 may be separated from the heater 1004 by any suitable material(s), such as silicon dioxide. The micro-ring resonator 1002 and heater 1004 may each have any suitable size, shape, and dimensions. In some embodiments, the micro-ring resonator 1002 is annular and has a diameter of about 6 μm, and the heater 1004 is crescent-shaped and has a diameter of about 6 μm. However, other shapes and sizes may be used here. A gap 1008 between the micro-ring resonator 1002 and the signal pathway 354 may have any suitable value, such as about 150 nm to about 210 nm (±10 nm). In some cases, design parameters like the thickness of the micro-ring resonator 1002 and/or the size of the gap 1008 can be altered in order to provide desired functionality for the modulator 356.

As shown in FIG. 11, the modulator 356 here represents a PN junction micro-ring modulator that is implemented using various regions of semiconductor material, such as doped and undoped silicon. In this example, the modulator 356 is shown in cross-section for explanation. Here, the modulator 356 includes a first annular semiconductor region 1102 separated from a second annular semiconductor region 1104. The annular semiconductor regions 1102 and 1104 can represent different types of semiconductor material, such as when the annular semiconductor region 1102 represents an N-type semiconductor material and the annular semiconductor region 1104 represents a P-type semiconductor material. A semiconductor region 1106 (such as undoped silicon) can separate the regions 1102-1104. A doped semiconductor region 1108 is positioned within the annular regions 1102-1104, and a doped semiconductor region 1110 is positioned around an upper portion of the doped semiconductor region 1108. The doped semiconductor regions 1108 and 1110 can represent different regions of semiconductor material with different dopants, such as when the doped semiconductor region 1108 is doped with an N+ dopant and the doped semiconductor region 1110 is doped with a P+ dopant. An electrical contact 1112 can be used to form an electrical connection with the doped semiconductor region 1108, and an electrical contact 1114 can be used to form an electrical connection with the doped semiconductor region 1110. An electrical connection 1116 can be used to provide a voltage to the electrical contact 1112, and an electrical connection 1118 can be used to provide a voltage to the electrical contact 1114.

Here, the various semiconductor regions 1102-1110 form a PN junction micro-ring modulator, and the electrical contacts 1112, 1114 and electrical connections 1116, 1118 allow voltages to be applied that alter the charge carrier density of the PN junction micro-ring modulator. This alters the phase of an optical signal flowing through the associated signal pathway 354. Voltages applied to the electrical connections 1116, 1118 can provide the desired voltage difference and therefore implement the desired phase shift of the optical signal flowing through the signal pathway 354. Different voltages applied to the electrical connections 1116, 1118 can cause different phase shifts to occur in the modulator 356.

Although FIGS. 10 and 11 illustrate examples of modulators 356 in unit cells 304 of an optical phased array 302, various changes may be made to FIGS. 10 and 11. For example, the actual structure of a thermal resonator or PN junction micro-ring modulator can vary as needed or desired. Also, any other suitable structure may be used to phase-modulate an optical signal in each unit cell 304.

Figure 12:
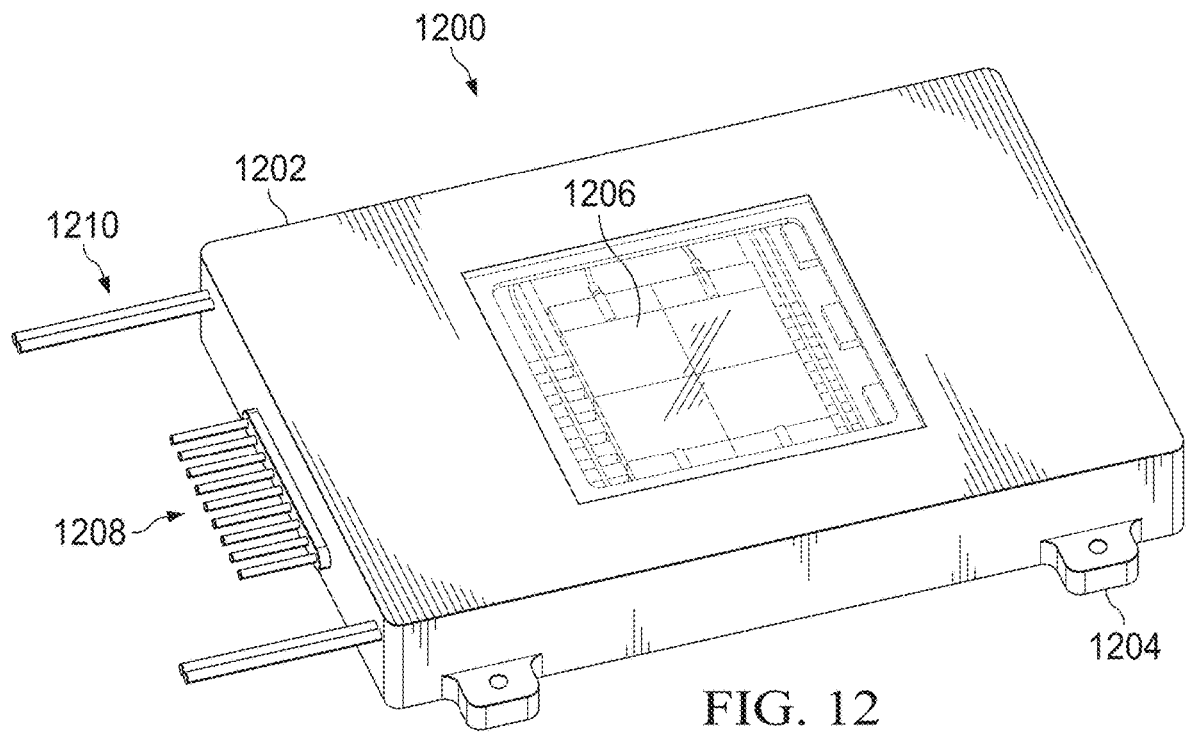
FIGS. 12 through 14 illustrate a specific example photonic integrated circuit-based optical device supporting polarization-independent communication according to this disclosure.
Figure 13:
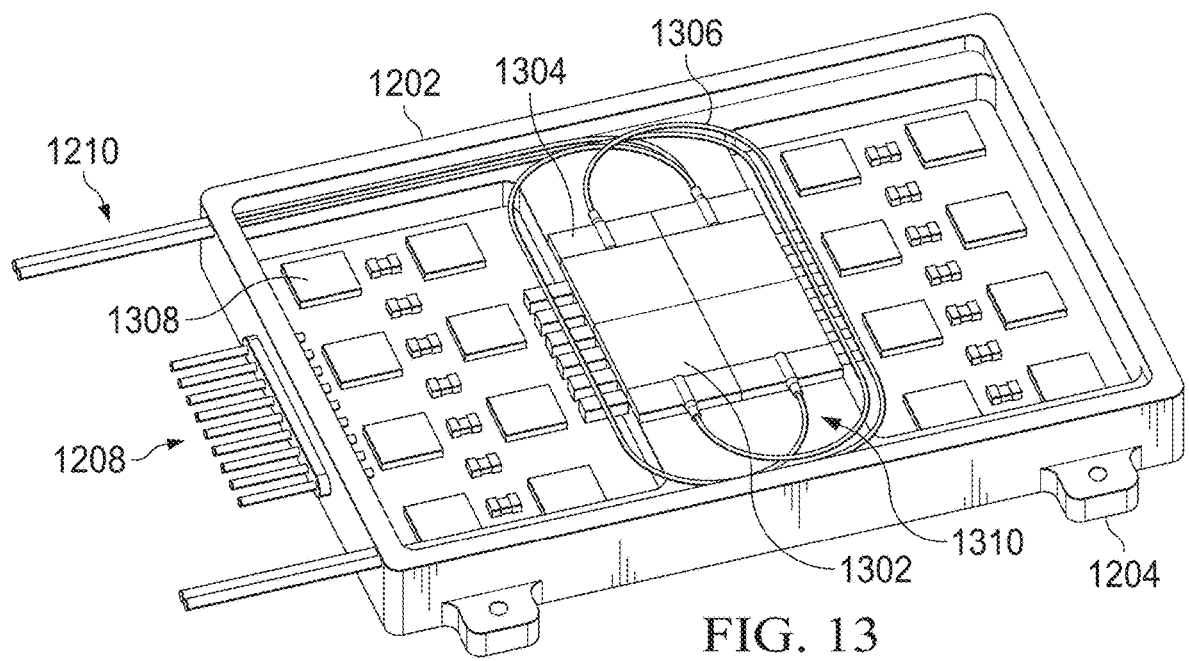
Figure 14:
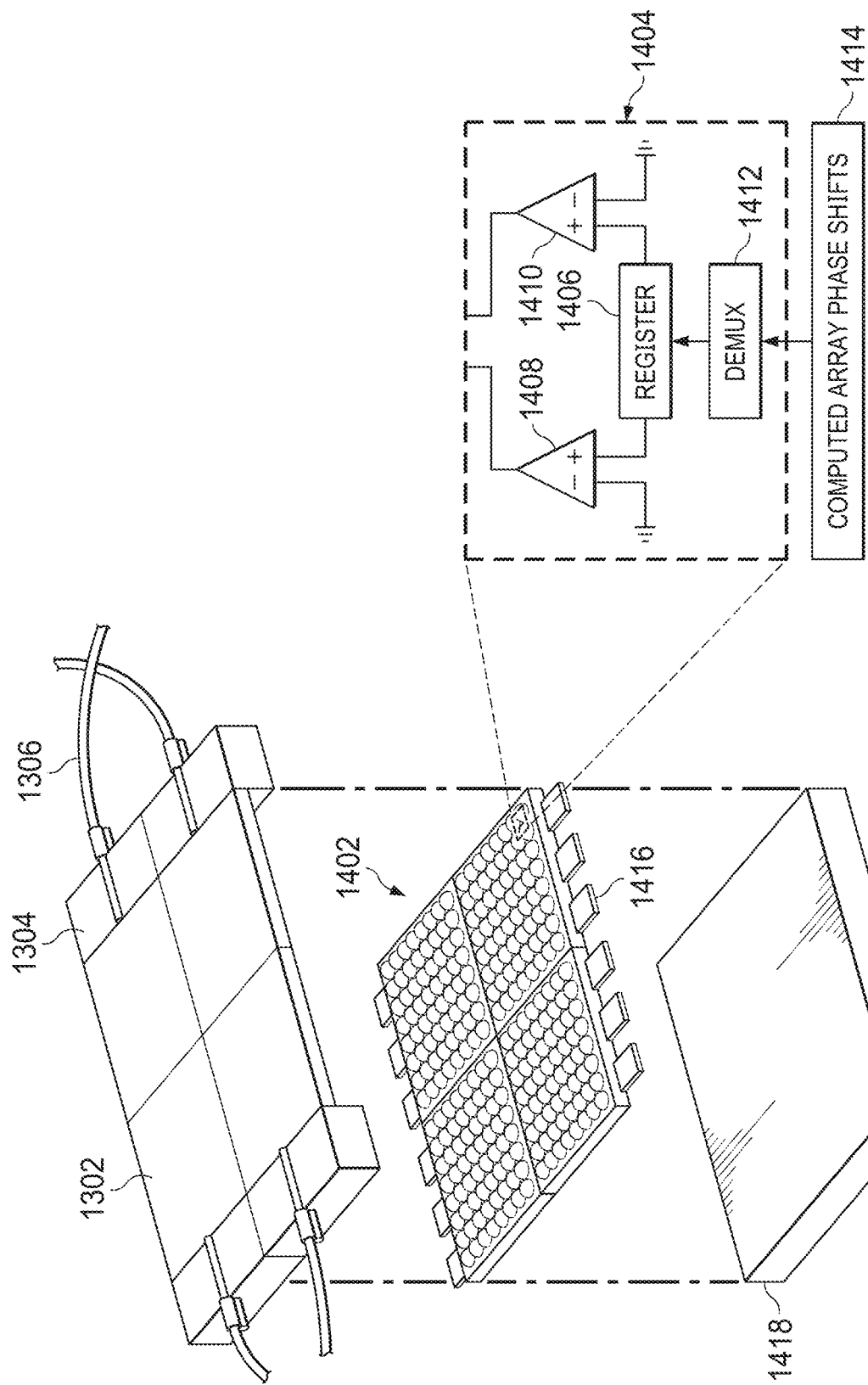

FIGS. 12 through 14 illustrate a specific example photonic integrated circuit-based optical device 1200 supporting polarization-independent communication according to this disclosure. The optical device 1200 here may represent a specific implementation of the optical device 300 described above. As shown in FIG. 12, the optical device 1200 includes a package 1202, which surrounds and protects electronic and optical components of an optical transmitter, optical receiver, or optical transceiver. For example, the package 1202 may encase and form a hermetic seal around the electronic and optical components. The package 1202 may be formed from any suitable material(s), such as one or more metals, and in any suitable manner. In some embodiments, the package 1202 is formed using a nickel-cobalt or nickel-iron alloy (such as KOVAR) or other material that has a coefficient of thermal expansion closely matched to that of borosilicate or other glass. The package 1202 may also have any suitable size, shape, and dimensions. In some cases, the package 1202 may be formed in multiple parts that can be bonded, sealed, or otherwise coupled together to enclose the electronic and optical components. For example, the package 1202 may be formed using a larger lower portion and an upper cover such that the electronic and optical components can be inserted into the lower portion and the upper cover can be connected to the lower portion. Also, in some cases, the package 1202 may include flanges 1204 that support mounting of the package 1202 to a larger structure. However, the package 1202 may have any other suitable form.

The package 1202 includes an optical window 1206, which is substantially or completely transparent optically (at least with respect to the optical signals being transmitted from or received by the optical device 1200). The optical window 1206 may be formed from any suitable material(s), such as borosilicate glass or other glass, and in any suitable manner. The optical window 1206 may also have any suitable size, shape, and dimensions. In some cases, the optical window 1206 may also function as a bandpass or other optical filter that filters the wavelength(s) of the optical signals being transmitted from or received by the optical device 1200.

The package 1202 may also include one or more electrical feedthroughs 1208, which represent one or more electrical connections that can be used to transport one or more electrical signals between the interior and the exterior of the package 1202. The one or more electrical signals may be used here for any suitable purposes, such as to control one or more operations of the optical device 1200. As a particular example, the one or more electrical signals may be used for controlling the phases of antenna elements of a photonic integrated circuit in the optical device 1200. In addition, the package 1202 may include one or more fiber inputs/outputs 1210, which can be used to provide one or more input signals to the optical device 1200 and/or receive one or more output signals from the optical device 1200. The one or more input signals may carry information to be transmitted from the optical device 1200. The one or more output signals may carry information received at and recovered by the optical device 1200. In this example, there are two fiber inputs/outputs 1210, although the optical device 1200 may include a single fiber input/output 1210 or more than two fiber inputs/outputs 1210. Note, however, that no fiber inputs/outputs 1210 may be needed if all optical generation and processing occurs using components within the package 1202, in which case the electrical feedthroughs 1208 may be used to transport information to or from the optical device 1200.

As shown in FIG. 13, a photonic integrated circuit 1302 is positioned within the package 1202, namely at a location where the photonic integrated circuit 1302 can transmit and/or receive optical signals through the optical window 1206. The photonic integrated circuit 1302 may, for example, represent the PIC-based optical phased array 302 described above and may include unit cells 304 having any of the various forms described above. The photonic integrated circuit 1302 can be used to support optical transmission and/or optical reception, depending on the design of the photonic integrated circuit 1302. The photonic integrated circuit 1302 may also support a number of additional optical functions as needed or desired. The photonic integrated circuit 1302 may be formed from any suitable material(s), such as silicon, indium phosphide, or gallium arsenide, and in any suitable manner. The photonic integrated circuit 1302 may also have any suitable size, shape, and dimensions. As a particular example, the photonic integrated circuit 1302 may be square and have an edge length of about 40 mm, although any other suitable sizes and shapes may be used here.

Fiber mounts 1304 are used to couple to optical fibers 1306 at locations where the optical fibers 1306 can provide optical signals to and/or receive optical signals from the photonic integrated circuit 1302. For example, the optical fibers 1306 may provide optical signals from a source laser to the photonic integrated circuit 1302 for use during outgoing transmissions. The optical fibers 1306 may also or alternatively provide optical signals received by the photonic integrated circuit 1302 to a receiver for processing. Each fiber mount 1304 includes any suitable structure configured to be coupled to an optical fiber 1306. Each optical fiber 1306 represents any suitable length of an optical medium configured to transport optical signals to or from a photonic integrated circuit 1302. Note that while four fiber mounts 1304 and optical fibers 1306 are shown here, the optical device 1200 may include, one, two, three, or more than four fiber mounts 1304 and optical fibers 1306. Also note that no fiber mounts 1304 and optical fibers 1306 may be needed if all optical generation and processing occurs using components of the photonic integrated circuit 1302.

An electronic control board 1308 includes electronic components, such as one or more integrated circuit chips and other components, that control the operation of the photonic integrated circuit 1302. For example, the electronic control board 1308 may include one or more components that calculate desired phases for optical signals to be generated by antenna elements of the photonic integrated circuit 1302, which allows the electronic control board 1308 to control beam forming or beam steering operations. Also or alternatively, the electronic control board 1308 may include one or more components that calculate desired phases to be applied to optical signals received by antenna elements of the photonic integrated circuit 1302, which allows the electronic control board 1308 to control wavefront reconstruction operations. These decisions can be used to adjust the modulators 356 within the unit cells 304 of the photonic integrated circuit 1302. The electronic control board 1308 includes any suitable components configured to perform one or more desired functions related to a photonic integrated circuit 1302. Spacers 1310 may be positioned on opposite sides of the photonic integrated circuit 1302 and used to help separate the optical fibers 1306 from the electronic control board 1308. The spacers 1310 may be formed from any suitable material(s), such as ceramic, and in any suitable manner.

As shown in FIG. 14, the photonic integrated circuit 1302 is electrically coupled to a digital read in integrated circuit (DRIIC) layer 1402, which is used to provide electrical signals to the modulators 356 in the unit cells 304 of the photonic integrated circuit 1302 in order to control the phase modulations applied to the incoming or outgoing optical signals by the modulators 356. In some embodiments, the photonic integrated circuit 1302 can be "flip-chip" bonded to the DRIIC layer 1402, although other mechanisms for electrically coupling the photonic integrated circuit 1302 and the DRIIC layer 1402 may be used.

The DRIIC layer 1402 in this example includes a number of individual DRIIC cells 1404, where each DRIIC cell 1404 may be associated with (and in some cases may have about the same size as) a corresponding one of the unit cells 304 in the photonic integrated circuit 1302. The DRIIC cells 1404 control the phase modulations that are applied by the modulators 356 of the unit cells 304. The DRIIC cells 1404 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 1404 may operate to convert digital values into suitable DC analog voltages between 0 V and 12.3 V, although other voltages (including negative voltages) can be supported depending on the implementation.

In this example, each DRIIC cell 1404 may include a register 1406 configured to store values associated with different phase shifts to be applied by the modulator 356 of its corresponding unit cell 304. To provide a desired phase shift, appropriate values from the register 1406 are selected and provided to two amplifiers 1408 and 1410, which generate output voltages that are provided to the associated modulator 356. The output voltages control the phase shift provided by the associated modulator 356. Different values from the register 1406 are provided to the amplifiers 1408 and 1410 over time so that different output voltages are applied to the associated modulator 356. In this way, each DRIIC cell 1404 can cause its associated modulator 356 to provide different phase shifts over time, thereby supporting various functions like beam forming, beam steering, or wavefront reconstruction. In some cases, the outputs of the amplifiers 1408 and 1410 can be coupled to the electrical contacts 1006 of a thermal resonator or to the electrical connections 1116 and 1118 of a PN junction modulator.

In some embodiments, each DRIIC cell 1404 may be used to provide a relatively small number of different output voltages to its associated modulator 356. For example, in some cases, each DRIIC cell 1404 can cause the associated modulator 356 to provide four different phase shifts. However, other numbers of output voltages and associated phase shifts may be supported here, such as when up to 256 different phase shifts or more are supported. Also, the output voltages provided to the modulators 356 in different DRIIC cells 1404 may be different even when those modulators 356 are providing the same phase shift, which may be due to factors such as manufacturing tolerances. The actual output voltages used for each modulator 356 can be selected during calibration so that appropriate values may be stored in each register 1406.

In this example, the actual values in each DRIIC cell 1404 that are provided to the amplifiers 1408 and 1410 by the register 1406 over time can be controlled using a demultiplexer 1412. Each demultiplexer 1412 receives a stream of computed array phase shifts 1414 and outputs the phase shifts 1414 that are to be applied by that DRIIC cell's associated modulator 356. The phase shifts 1414 output by the demultiplexer 1412 can identify or otherwise to be used to select specific values from the register 1406 to be output to the amplifiers 1408 and 1410. The computed array phase shifts 1414 here may be provided by one or more external components, such as the electronic control board 1308 or an external component communicating with the electronic control board 1308. While not shown here, array-level deserialization circuitry may be used to separate and fan out high-speed digital signals to the array of individual DRIIC cells 1404.

Each register 1406 includes any suitable structure configured to store and retrieve values. Each amplifier 1408 and 1410 includes any suitable structure configured to generate a control voltage or other control signal based on an input. Each demultiplexer 1412 includes any suitable structure configured to select and output values.

Note that this represents one example way in which the modulators 356 of the unit cells 304 can be controlled. In general, any suitable technique may be used to provide suitable control voltages or other control signals to the modulators 356 for use in controlling the phase shifts provided by the modulators 356. For example, the approach shown in FIG. 14 allows values that are applied to the amplifiers 1408 and 1410 to be stored in the register 1406 and retrieved as needed, which allows an external component to provide indicators of the desired values to be retrieved to the DRIIC cells 1404. In other embodiments, an external component may provide digital values that are converted by different circuitry into analog values.

Various electrical connections 1416 are provided in or with the DRIIC layer 1402. The electrical connections 1416 may be used to provide electrical signals to the DRIIC cells 1404, such as when the electrical connections 1416 are used to receive high-speed digital signals containing the computed array phase shifts 1414 for the DRIIC cells 1404. Any suitable number and arrangement of electrical connections 1416 may be used here.

A thermal spreader 1418 can be positioned in thermal contact with the DRIIC layer 1402. The thermal spreader 1418 helps to provide a more consistent temperature across the DRIIC layer 1402 and the photonic integrated circuit 1302 by functioning as a heat sink that removes thermal energy from the DRIIC layer 1402 and the photonic integrated circuit 1302. At times, the thermal spreader 1418 may also provide thermal energy to the DRIIC layer 1402, which helps to heat the DRIIC layer 1402 and the photonic integrated circuit 1302. Thermal energy that is generated by the DRIIC layer 1402 and/or injected into the photonic integrated circuit 1302 may vary over time, and the thermal spreader 1418 can help to maintain a substantially constant temperature of the photonic integrated circuit 1302. The thermal spreader 1418 may be formed from any suitable material(s), such as one or more metals like copper, and in any suitable manner. The thermal spreader 1418 may also have any suitable size, shape, and dimensions.

Although FIGS. 12 through 14 illustrate one specific example of a photonic integrated circuit-based optical device 1200 supporting polarization-independent communication, various changes may be made to FIGS. 12 through 14. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

The following describes example embodiments of this disclosure that implement or relate to photonic integrated circuit-based polarization-independent optical devices. However, other embodiments may be used in accordance with the teachings of this disclosure.

In a first embodiment, an apparatus includes a photonic integrated circuit having an optical phased array, where the optical phased array includes multiple unit cells. Each unit cell includes an antenna element configured to transmit or receive optical signals having a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

In a second embodiment, a system includes multiple optical devices configured to engage in optical communication. Each optical device includes a photonic integrated circuit having an optical phased array, where the optical phased array includes multiple unit cells. Each unit cell includes an antenna element configured to transmit or receive optical signals having a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

In a third embodiment, a method includes using an optical phased array of a photonic integrated circuit to transmit or receive optical signals, where the optical phased array includes multiple unit cells. Each unit cell includes an antenna element configured to transmit or receive the optical signals, where the optical signals have a linear polarization of light. Each unit cell also includes a modulator configured to phase-shift the optical signals transmitted or received by the antenna element. Each unit cell further includes a quarter waveplate configured to convert between the linear polarization of light and a circular polarization of light.

Any single one or any suitable combination of the following features may be used with the first, second, or third embodiment. The quarter waveplate of each unit cell may be integrated within a stack of materials forming the unit cell and the quarter waveplate. The quarter waveplate of each unit cell may include a planar quarter waveplate. The quarter waveplate of each unit cell may include a non-planar quarter waveplate having one of: a thickness that changes in steps or a thickness that changes smoothly. The quarter waveplate of each unit cell may include a metamaterial. The quarter waveplate of each unit cell may include a polymer. The quarter waveplate of each unit cell may include a birefringent material. The quarter waveplate of each unit cell may include a zero order waveplate. The quarter waveplate of each unit cell may include quartz. Quarter waveplates in unit cells of optical phased arrays of multiple optical devices may be configured to allow the optical devices to engage in optical communication regardless of an angular orientation of the optical devices relative to one another.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document.

The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a photonic integrated circuit comprising an optical phased array, the optical phased array comprising multiple unit cells, each unit cell comprising:
   an antenna element configured to transmit or receive optical signals having a linear polarization of light;
   a modulator configured to phase-shift the optical signals transmitted or received by the antenna element; and
   a quarter waveplate configured to convert between the linear polarization of light and a circular polarization of light, the quarter waveplate comprising a non-planar quarter waveplate having one of: a thickness that changes in steps or a thickness that changes smoothly.

2. The apparatus of claim 1, wherein the quarter waveplate of each of the unit cells is integrated within a stack of materials forming the unit cell and the quarter waveplate.

3. The apparatus of claim 1, wherein the quarter waveplate of each of the unit cells comprises a metamaterial.

4. The apparatus of claim 1, wherein the quarter waveplate of each of the unit cells comprises a polymer.

5. The apparatus of claim 1, wherein the quarter waveplate of each of the unit cells comprises a birefringent material.

6. The apparatus of claim 1, wherein the quarter waveplate of each of the unit cells comprises a zero order waveplate.

7. The apparatus of claim 1, wherein the quarter waveplate of each of the unit cells comprises quartz.

8. A system comprising:
   multiple optical devices configured to engage in optical communication, where each optical device comprises a photonic integrated circuit that includes an optical phased array, the optical phased array comprising multiple unit cells, each unit cell comprising:
   an antenna element configured to transmit or receive optical signals having a linear polarization of light;
   a modulator configured to phase-shift the optical signals transmitted or received by the antenna element; and
   a quarter waveplate configured to convert between the linear polarization of light and a circular polarization of light, the quarter waveplate comprising a non-planar quarter waveplate having one of: a thickness that changes in steps or a thickness that changes smoothly.

9. The system of claim 8, wherein the quarter waveplate of each of the unit cells is integrated within a stack of materials forming the unit cell and the quarter waveplate.

10. The system of claim 8, wherein the quarter waveplate of each of the unit cells comprises a metamaterial.

11. The system of claim 8, wherein the quarter waveplate of each of the unit cells comprises a polymer.

12. The system of claim 8, wherein the quarter waveplate of each of the unit cells comprises a birefringent material.

13. The system of claim 8, wherein the quarter waveplate of each of the unit cells comprises a zero order waveplate.

14. The system of claim 8, wherein the quarter waveplate of each of the unit cells comprises quartz.

15. The system of claim 8, wherein the quarter waveplates in the unit cells of the optical phased arrays are configured to allow the optical devices to engage in optical communication regardless of an angular orientation of the optical devices relative to one another.

16. A method comprising:
   using an optical phased array of a photonic integrated circuit to transmit or receive optical signals, the optical phased array comprising multiple unit cells, each unit cell comprising:
   an antenna element configured to transmit or receive the optical signals, the optical signals having a linear polarization of light;
   a modulator configured to phase-shift the optical signals transmitted or received by the antenna element; and
   a quarter waveplate configured to convert between the linear polarization of light and a circular polarization of light, the quarter waveplate comprising a non-planar quarter waveplate having one of: a thickness that changes in steps or a thickness that changes smoothly.

17. The method of claim 16, wherein the quarter waveplate of each of the unit cells is integrated within a stack of materials forming the unit cell and the quarter waveplate.

18. The method of claim 16, wherein the quarter waveplate of each of the unit cells comprises a metamaterial.

19. The method of claim 16, wherein the quarter waveplate of each of the unit cells comprises a polymer.

20. The method of claim 16, wherein the quarter waveplate of each of the unit cells comprises a birefringent material.

* * * * *